US009821739B2

United States Patent
Yabu et al.

(10) Patent No.: US 9,821,739 B2
(45) Date of Patent: Nov. 21, 2017

(54) AUTOMOBILE BUMPER

(71) Applicant: HONDA MOTOR CO., LTD., Minato-Ku, Tokyo (JP)

(72) Inventors: Tomoya Yabu, Wako (JP); Masakazu Kashiwagi, Wako (JP); Yusuke Maesako, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 28 days.

(21) Appl. No.: 15/109,531

(22) PCT Filed: Nov. 4, 2014

(86) PCT No.: PCT/JP2014/079231
§ 371 (c)(1),
(2) Date: Jul. 1, 2016

(87) PCT Pub. No.: WO2015/104889
PCT Pub. Date: Jul. 16, 2015

(65) Prior Publication Data
US 2016/0325701 A1    Nov. 10, 2016

(30) Foreign Application Priority Data

Jan. 10, 2014  (JP) ................................. 2014-003037

(51) Int. Cl.
B60R 19/00      (2006.01)
B60R 19/03      (2006.01)
B60R 19/18      (2006.01)

(52) U.S. Cl.
CPC .............. *B60R 19/03* (2013.01); *B60R 19/18* (2013.01); *B60R 2019/1853* (2013.01)

(58) Field of Classification Search
CPC .. B60R 19/03; B60R 19/18; B60R 2019/1853
(Continued)

(56) References Cited

U.S. PATENT DOCUMENTS 3,877,741 A * 4/1975 Wilfert ................... B60R 19/04
                                                            293/120
4,275,912 A * 6/1981 Bayer .................... B60R 19/18
                                                            293/120
(Continued)

FOREIGN PATENT DOCUMENTS

JP    H02-175451 A    7/1990
JP    H06-122352 A    5/1994
(Continued)

*Primary Examiner* — Joseph D Pape
(74) *Attorney, Agent, or Firm* — Carrier Blackman & Associates, P.C.; Joseph P. Carrier; William D. Blackman

(57) ABSTRACT

An automobile bumper is provided in which the bumper beam includes a middle curved part that curves concavely rearwards and a pair of left and right curved parts that curve convexly rearwards, and the left and right curved parts includes a rear side frame connecting part and a load input part projecting rearwards the most among the bumper beam parts. Since the bumper beam includes a compression-resistant reinforcing part provided along the inner face in the fore-and-aft direction of the load input part, and an extension line of the compression-resistant reinforcing part is directed toward the vicinity of the load input point of the load input part, supporting the compressive load by the compression-resistant reinforcing part to thus prevent the bumper beam from being destroyed enables the strength toward bending deformation to be enhanced without reinforcement by increasing the plate thickness of the bumper beam.

8 Claims, 10 Drawing Sheets

(58) Field of Classification Search
USPC .................................................. 293/102, 120
See application file for complete search history.

(56) References Cited

U.S. PATENT DOCUMENTS

| | | | |
|---|---|---|---|
| 8,087,706 B2 * | 1/2012 | Karlander | ............... B60R 19/18 293/102 |
| 9,205,790 B2 | 12/2015 | Yabu et al. | |
| 2009/0066095 A1 * | 3/2009 | Karlander | ............... B60R 19/18 293/102 |
| 2015/0367795 A1 * | 12/2015 | Lee | ......................... B60R 19/18 293/120 |

FOREIGN PATENT DOCUMENTS

| | | |
|---|---|---|
| JP | 2827105 B2 | 11/1998 |
| JP | 2010-100265 A | 5/2010 |
| WO | 2013/094515 A1 | 6/2013 |

* cited by examiner

FIG.9
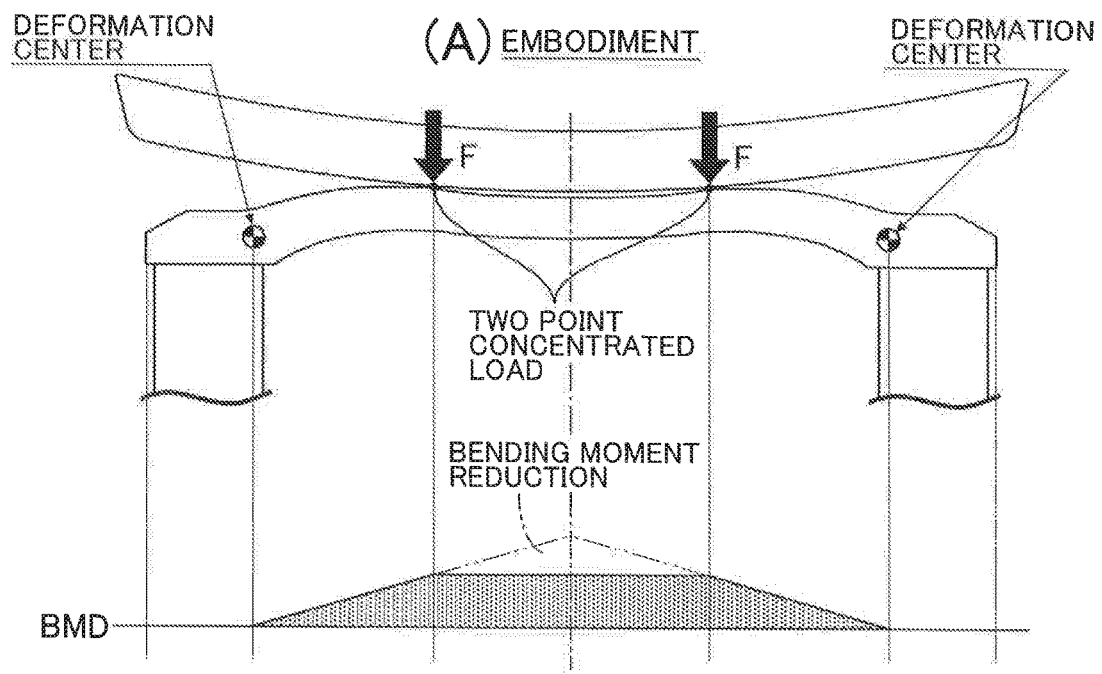
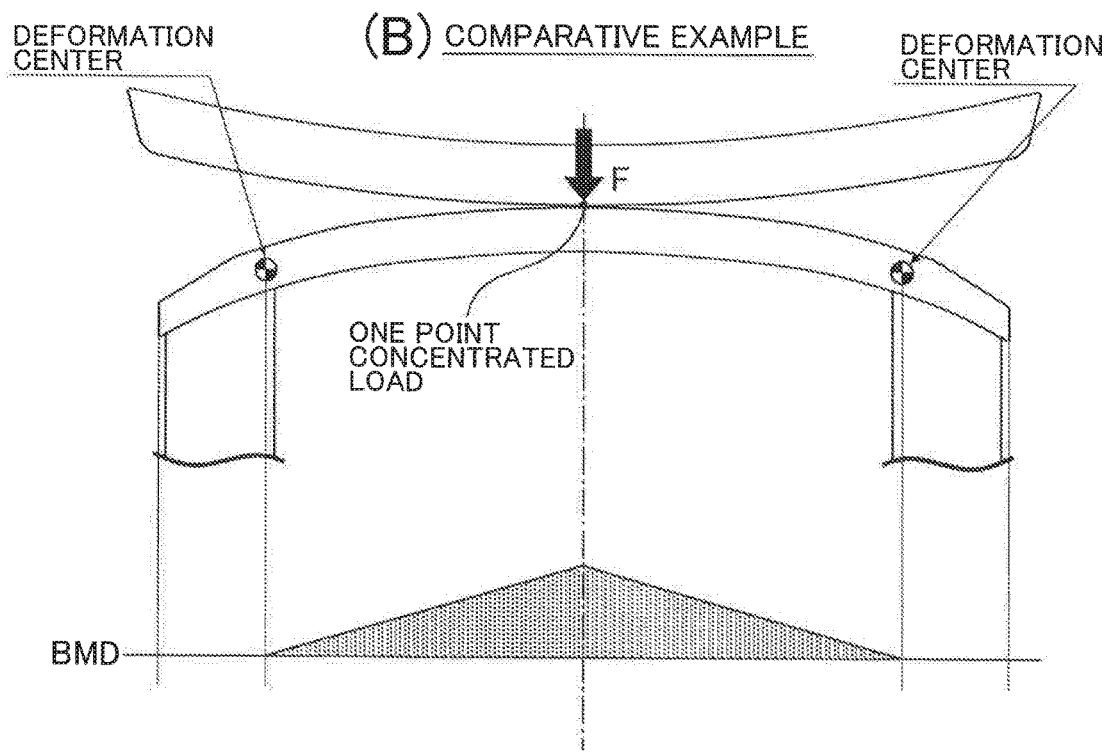

AUTOMOBILE BUMPER

TECHNICAL FIELD

The present invention relates to an automobile bumper that includes a fiber-reinforced resin bumper beam and has opposite end parts in a vehicle width direction of the bumper beam supported on an outer end part in a fore-and-aft direction of a pair of vehicle body frames.

BACKGROUND ART

An arrangement in which a bumper beam (bending support) extending in the vehicle width direction and a pair of bumper beam extensions (deforming projecting parts) extending in the fore-and-aft direction are formed as a unit from a fiber-reinforced resin, and the pair of bumper beam extensions are supported on end parts of a pair of vehicle body frames (longitudinal supports) is known from Patent Document 1 below.

RELATED ART DOCUMENTS

Patent Documents

Patent Document 1: Japanese Patent No. 2827105

SUMMARY OF THE INVENTION

Problems to be Solved by the Invention

In the conventional arrangement above, since the bumper beam simply undergoes bending deformation to thus absorb collision energy when the collision load of a light collision is inputted into the bumper beam, in order to enhance the collision energy absorbing effect it is necessary to enhance the bending strength so that the bumper beam does not break but undergoes sufficient bending deformation. In order to do that, it is necessary to increase the plate thickness of the bumper beam, but this causes the problem that the weight of the bumper beam cannot be lightened.

The present invention has been accomplished in light of the above circumstances, and it is an object thereof to provide an automobile bumper equipped with a bumper beam that is light in weight and has an excellent energy-absorbing effect when in a collision.

Means for Solving the Problems

In order to attain the above object, according to a first aspect of the present invention, there is provided an automobile bumper comprising a fiber-reinforced resin bumper beam and having opposite end parts in a vehicle width direction of the bumper beam supported on an outer end part in a fore-and-aft direction of a pair of vehicle body frames, wherein the bumper beam comprises a middle curved part that curves concavely toward an outside in a fore-and-aft direction in a middle part in the vehicle width direction, and a pair of left and right curved parts that curve convexly toward the outside in the fore-and-aft direction on opposite sides in the vehicle width direction of the middle curved part, and the left and right curved parts comprise a vehicle body frame connecting part that is positioned on the outside in the vehicle width direction and is connected to the vehicle body frame, and a load input part that is positioned on an inside in the vehicle width direction and projects most to the outside in the fore-and-aft direction among the bumper beam parts, a compression-resistant reinforcing part being provided along an inner face in the fore-and-aft direction of the load input part, and an extension line of the compression-resistant reinforcing part being directed toward a vicinity of a load input point of the load input part.

Further, according to a second aspect of the present invention, in addition to the first aspect, the bumper beam has a cross section having a U-shape or W-shape that opens toward an inside in the fore-and-aft direction, and the compression-resistant reinforcing part is a ridge line on the inside in the fore-and-aft direction of the bumper beam.

Furthermore, according to a third aspect of the present invention, in addition to the first or second aspect, the vehicle body frame connecting part, which is continuous with the compression-resistant reinforcing part, comprises a reinforcing bead extending in the fore-and-aft direction.

Moreover, according to a fourth aspect of the present invention, in addition to any one of the first to third aspects, a back plate is fixed to the compression-resistant reinforcing part, and the bumper beam and the back plate form a closed cross-section.

Further, according to a fifth aspect of the present invention, in addition to any one of the first to fourth aspects, a reinforcing member is disposed in an interior of the load input part, an inner end in the vehicle width direction of the reinforcing member is connected to the load input point, and an outer end in the vehicle width direction is connected to the compression-resistant reinforcing part.

Furthermore, according to a sixth aspect of the present invention, in addition to the fifth aspect, the reinforcing member comprises a reinforcing bead extending in the vehicle width direction.

Moreover, according to a seventh aspect of the present invention, in addition to the fifth or sixth aspect, the bumper beam and the reinforcing member form a closed cross-section.

Further, according to an eighth aspect of the present invention, in addition to the seventh aspect, the reinforcing member is molded integrally with the bumper beam by a gas assist method.

A rear side frame 12 of an embodiment corresponds to the vehicle body frame of the present invention, a rear side frame connecting part B1 of the embodiment corresponds to the vehicle body frame connecting part of the present invention, and an upper ridge line a and a lower ridge line b of the embodiment correspond to the ridge line of the present invention.

Effects of the Invention

In accordance with the first aspect of the present invention, the automobile bumper includes the fiber-reinforced resin bumper beam, and the opposite end parts in the vehicle width direction of the bumper beam are supported on the outer end parts in the fore-and-aft direction of the pair of vehicle body frames.

The bumper beam is formed from the middle curved part curving concavely toward the outside in the fore-and-aft direction in the middle part in the vehicle width direction, and the pair of left and right curved parts curving convexly toward the outside in the fore-and-aft direction on opposite sides in the vehicle width direction of the middle curved part. The left and right curved parts include the vehicle body frame connecting part positioned on the outside in the vehicle width direction and connected to the vehicle body frame, and the load input part positioned on the inside in the vehicle width direction and projecting the most toward the outside in the fore-and-aft direction among the bumper beam parts. It is therefore possible, by inputting a collision load in a concentrated manner into the load input point of the load input part of the pair of left and right curved parts of the bumper beam, to reduce the maximum value of the bending moment due to the collision load and prevent the bumper beam from being destroyed.

Moreover, although a compressive load acts on the load input part on the outside in the vehicle width direction of the pair of load input points due to the shape of the bumper beam, since the bumper beam includes the compression-resistant reinforcing part provided along the inner face in the fore-and-aft direction of the load input part, and the extension line of the compression-resistant reinforcing part is directed toward the vicinity of the load input point of the load input part, supporting the compressive load by means of the compression-resistant reinforcing part to thus prevent the bumper beam from being destroyed enables the strength toward bending deformation to be enhanced without reinforcement by increasing the plate thickness of the bumper beam.

Furthermore, in accordance with the second aspect of the present invention, since the cross section of the bumper beam is a U-shape or W-shape opening toward the inside in the fore-and-aft direction, and the compression-resistant reinforcing part is the ridge line on the inside in the fore-and-aft direction of the bumper beam, it is possible to provide the compression-resistant reinforcing part with a simple structure without adding a special member.

Moreover, in accordance with the third aspect of the present invention, since the vehicle body frame connecting part that is continuous with the compression-resistant reinforcing part includes the reinforcing beads extending in the fore-and-aft direction, it is possible, by crumpling of the vehicle body frame connecting part, which is reinforced by the reinforcing beads, to absorb the collision energy of an offset collision or high speed collision, which is difficult to absorb by means of bending deformation of the bumper beam itself.

Furthermore, in accordance with the fourth aspect of the present invention, since the back plate is fixed to the compression-resistant reinforcing part, and a closed cross-section is formed from the bumper beam and the back plate, preventing the bumper beam from deforming in the mouth opening direction by forming a closed cross-section enables a compressive load to be supported more effectively to thus absorb the collision energy.

Moreover, in accordance with the fifth aspect of the present invention, since the reinforcing member is disposed in the interior of the load input part, the inner end in the vehicle width direction of the reinforcing member is connected to the load input point, and the outer end in the vehicle width direction is connected to the compression-resistant reinforcing part, the load input point into which the collision load is input is reinforced by the reinforcing member, and the collision load input into the load input point is transmitted directly to the compression-resistant reinforcing part via the reinforcing member, thus further enhancing the strength of the bumper beam toward a compressive load.

Furthermore, in accordance with the sixth aspect of the present invention, since the reinforcing member includes the reinforcing bead extending in the vehicle width direction, it is possible to enhance the strength of the reinforcing member by means of the reinforcing bead, thus enabling a collision load input into the load input point to be transmitted to the compression-resistant reinforcing part more effectively.

Moreover, in accordance with the seventh aspect of the present invention, since a closed cross-section is formed from the bumper beam and the reinforcing member, it is possible to further enhance the strength of the bumper beam toward a compressive load.

Furthermore, in accordance with the eighth of the present invention, since the reinforcing member is molded integrally with the bumper beam by a gas assist method, the closed cross-section member can be molded integrally.

BRIEF DESCRIPTION OF DRAWINGS

FIG. 9 is a diagram for explaining the operation when in a rear-end collision. (first embodiment)

EXPLANATION OF REFERENCE NUMERALS AND SYMBOLS

Figure 1:
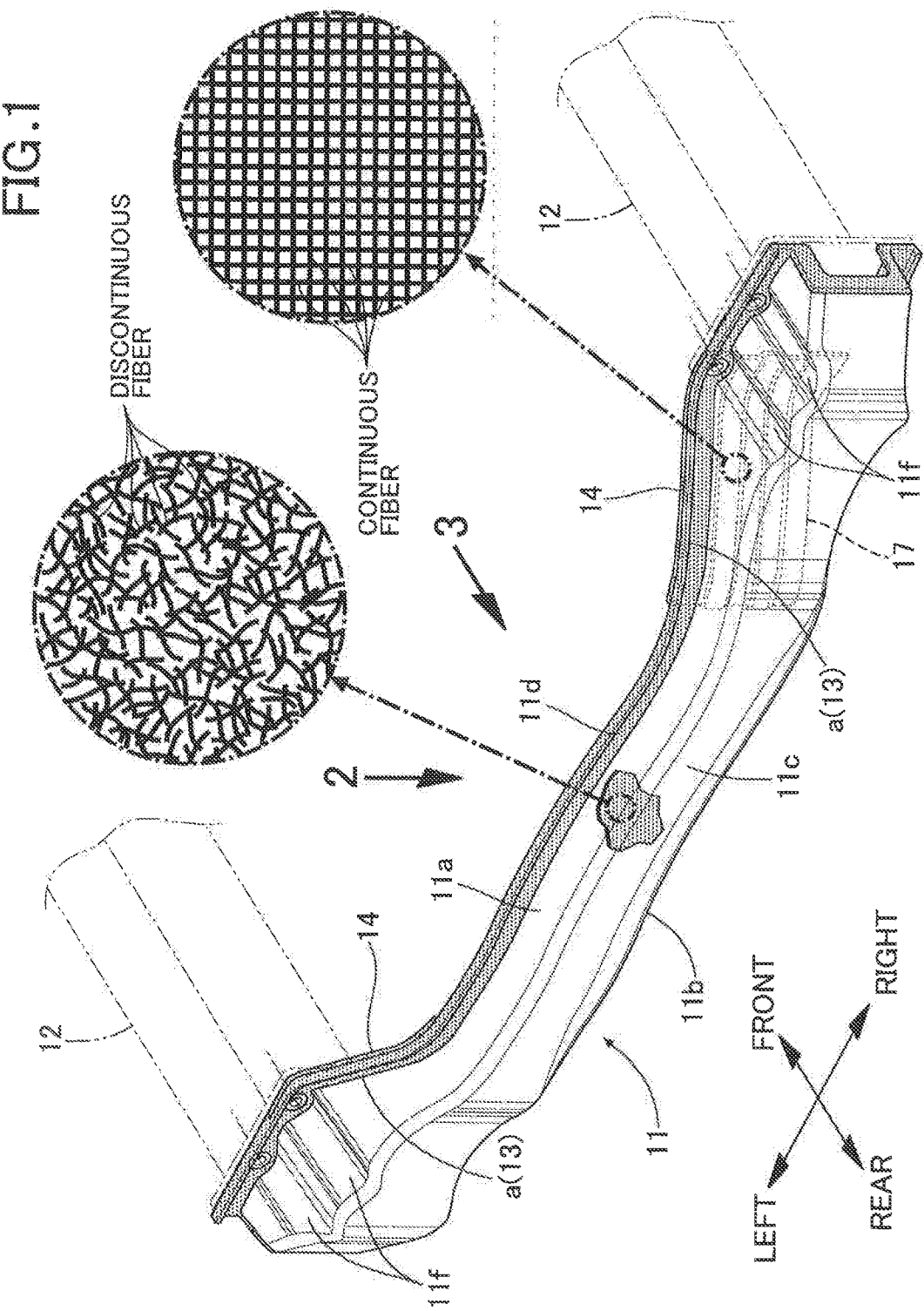
FIG. 1 is a perspective view of a bumper beam and a rear side frame. (first embodiment)

11 Bumper beam
11f Reinforcing bead
12 Rear side frame (vehicle body frame)
13 Compression-resistant reinforcing part
14 Back plate
17 Reinforcing member
17c Reinforcing bead
A Middle curved part
B Left and right curved parts
B1 Rear side frame connecting part (vehicle body frame connecting part)
B2 Load input part
L Extension line of compression-resistant reinforcing part
P Load input point
a Upper ridge line (ridge line)
b Lower ridge line (ridge line)

MODES FOR CARRYING OUT THE INVENTION

Embodiments of the present invention are explained by reference to the attached drawings. In the present specification, the fore-and-aft direction, the left-and-right direction (vehicle width direction), and the vertical direction are defined with reference to an occupant seated on a driving seat.

FIRST EMBODIMENT

A first embodiment of the present invention is now explained by reference to FIG. 1 to FIG. 9.

As shown in FIG. 1 to FIG. 5, a bumper beam 11, made of a fiber-reinforced resin, is disposed in the vehicle width direction on an automobile vehicle body rear part, and opposite end parts in the vehicle width direction of the bumper beam 11 are supported at rear ends of a pair of left and right rear side frames 12 and 12 disposed in the fore-and-aft direction.

The bumper beam 11 is a U-shaped cross-section member having an upper wall 11a, a lower wall 11b, and a rear wall 11c and opening toward the front. An upper flange 11d is bent upward from the front end of the upper wall 11a via an upper ridge line a, and a lower flange 11e is bent downward from the front end of the lower wall 11b via a lower ridge line b.

When viewed from above, the bumper beam 11 is formed from a middle curved part A that is curved concavely toward the rear over a predetermined range in the middle in the vehicle width direction and a pair of left and right curved parts B and B that are curved convexly toward the rear on opposite sides in the vehicle width direction of the middle curved part A. The left and right curved parts B include a rear side frame connecting part B1 that is positioned on the outside in the vehicle width direction and is connected to the rear side frame 12 and a load input part B2 that is positioned on the inside in the vehicle width direction and projects the most rearward among the bumper beam 11 parts.

When the bumper beam 11 is viewed from above, the upper flange 11d and the lower flange 11e extend linearly between a position slightly further outside in the vehicle width direction than a load input point P projecting the most rearward of the load input part B2 and the outer end in the vehicle width direction of the load input part B2. The upper ridge line a that faces the linear upper flange 11d and the lower ridge line b that faces the linear lower flange 11e form a compression-resistant reinforcing part 13 of the present invention. An extension line L of the compression-resistant reinforcing part 13 whose inside in the vehicle width direction is inclined rearward with respect to its outside passes through the vicinity of the load input point P (see FIG. 2 and FIG. 4).

Figure 6:
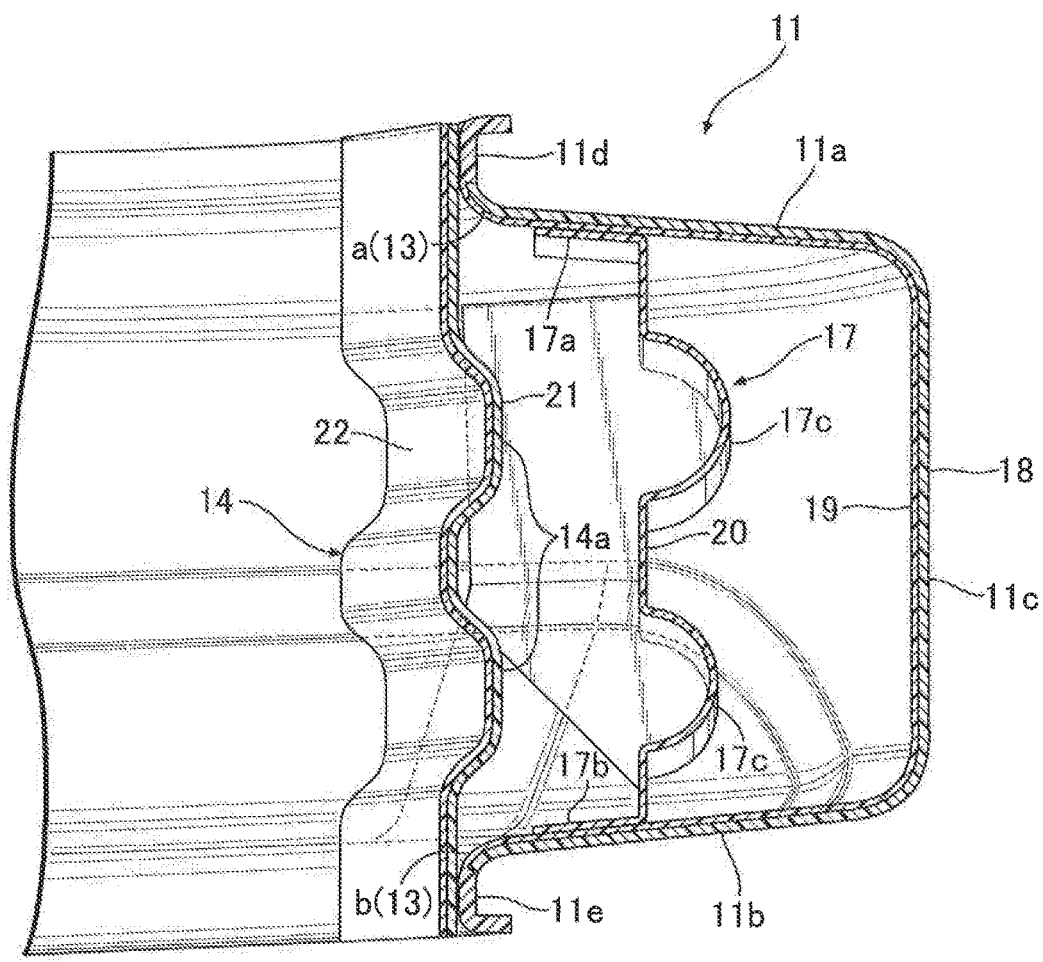
FIG. 6 is a sectional view along line 6-6 in FIG. 4. (first embodiment)
Figure 7:
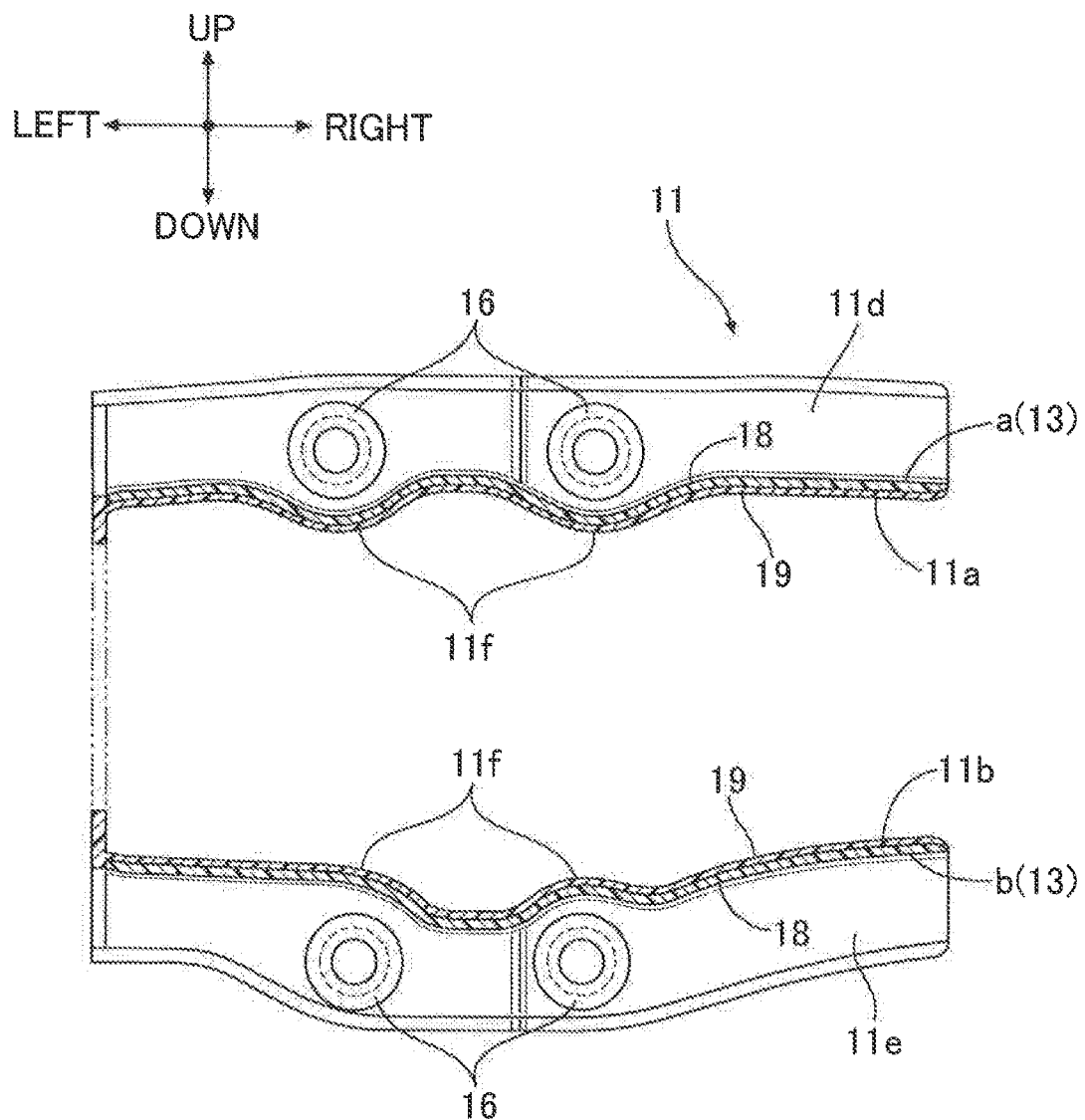
FIG. 7 is a sectional view along line 7-7 in FIG. 4. (first embodiment)

As is clear from referring in addition to FIG. 6 and FIG. 7, a back plate 14 formed into a plate shape using a fiber-reinforced resin is fixed by adhesion or welding so as to bridge between the vicinity of the load input point P and a portion on the inside in the vehicle width direction of the rear side frame connecting part B1 and to bridge between the upper flange 11d and a front face of the lower flange 11e, and a closed cross-section is formed in this area from the bumper beam 11 and the back plate 14. Formed on the back plate 14 so as to project forward are two, that is, upper and lower reinforcing beads 14a and 14a extending in the vehicle width direction. The compression-resistant reinforcing part 13 and the back plate 14 are disposed so as to overlap each other in the vehicle width direction.

Formed on each of the upper wall 11a and the lower wall 11b in the rear side frame connecting part B1 are a pair of left and right reinforcing beads 11f and 11f projecting in the vertical direction and extending in the fore-and-aft direction. Furthermore, embedded in each of the upper flange 11d and the lower flange 11e in the rear side frame connecting part B1 are two collars 16 and 16 through which bolts 15 for fixing it to the rear end of the rear side frame 12 extend.

Furthermore, a reinforcing member 17, made of a fiber-reinforced resin, is disposed in the interior of the load input part B2. When viewed from above, the reinforcing member 17 is disposed substantially parallel to the compression-resistant reinforcing part 13 so as to connect a part of the rear wall 11c that is slightly further outside in the vehicle width direction than the load input point P and parts of the upper flange 11d and the lower flange 11e that are at the outer ends in the vehicle width direction of the load input part B2. An upper flange 17a formed by bending forward the upper end of the reinforcing member 17 is connected to a lower face of the upper wall 11a of the bumper beam 11, and a lower flange 17b formed by bending forward the lower end of the reinforcing member 17 is connected to an upper face of the lower wall 11b of the bumper beam 11. Furthermore, formed on the reinforcing member 17 are two, that is, upper and lower reinforcing beads 17c and 17c extending in the vehicle width direction so as to project toward the rear.

Figure 5:
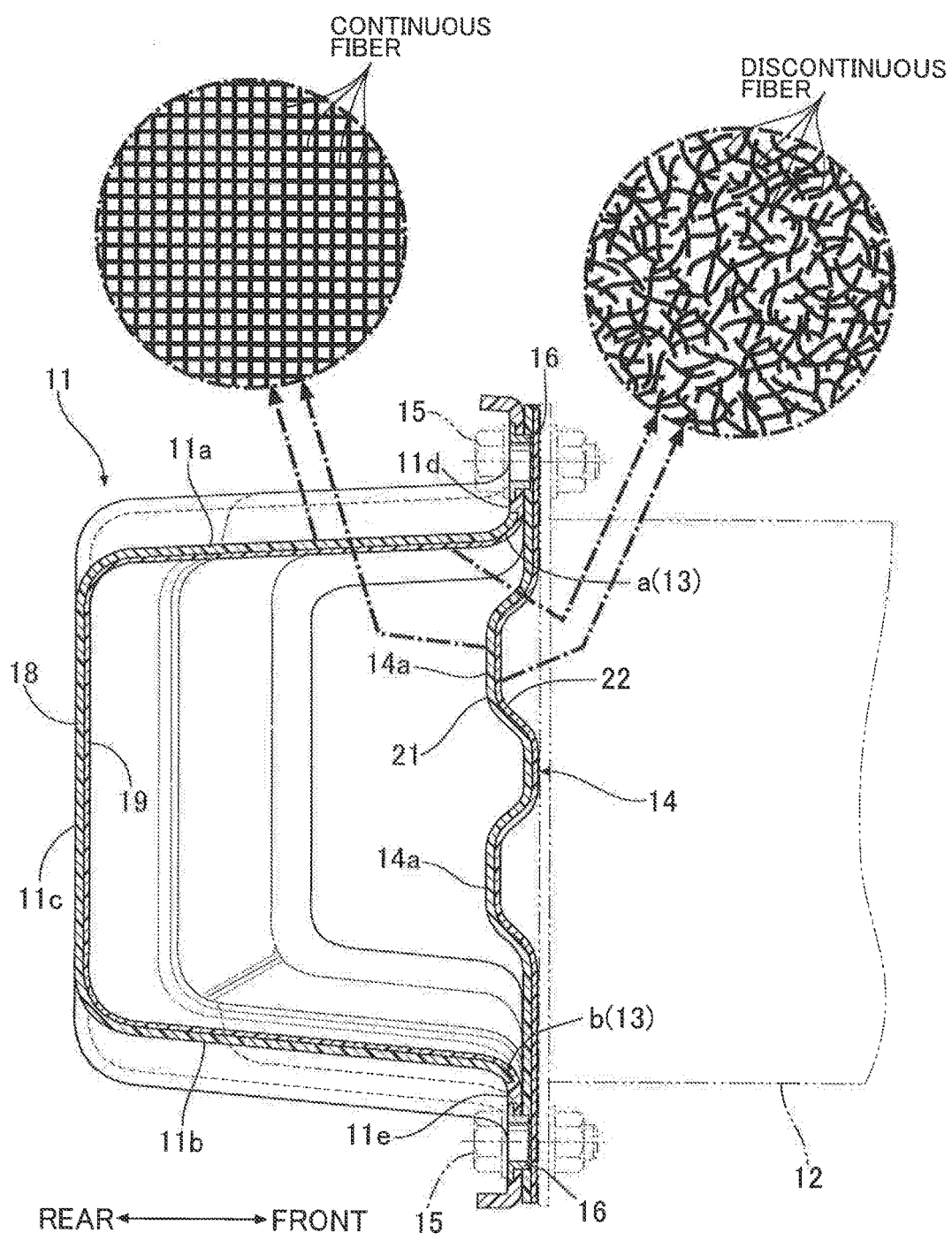
FIG. 5 is a sectional view along line 5-5 in FIG. 4. (first embodiment)

The bumper beam 11 is formed by laminating a continuous fiber-reinforced resin sheet 18 positioned on the rear face side and a discontinuous fiber-reinforced resin sheet 19 positioned on the front face side into two layers (see FIG. 5 and FIG. 6). The continuous fiber-reinforced resin sheet 18 is formed by hardening a woven fabric made of a continuous glass fiber oriented in the vehicle width direction and a continuous glass fiber oriented in a vertical direction or fore-and-aft direction, which is orthogonal to the vehicle width direction, with a thermoplastic resin (e.g. nylon), and the discontinuous fiber-reinforced resin sheet 19 is formed by hardening discontinuous glass fibers randomly oriented and tangled with each other with a thermoplastic resin (e.g. nylon). The reinforcing member 17 is formed from a discontinuous fiber-reinforced resin sheet 20 that is similar to the discontinuous fiber-reinforced resin sheet 19 of the bumper beam 11.

The back plate 14 is formed by laminating a continuous fiber-reinforced resin sheet 21 on the rear face side and a discontinuous fiber-reinforced resin sheet 22 on the front face side into two layers (see FIG. 5 and FIG. 6).

Figure 8:
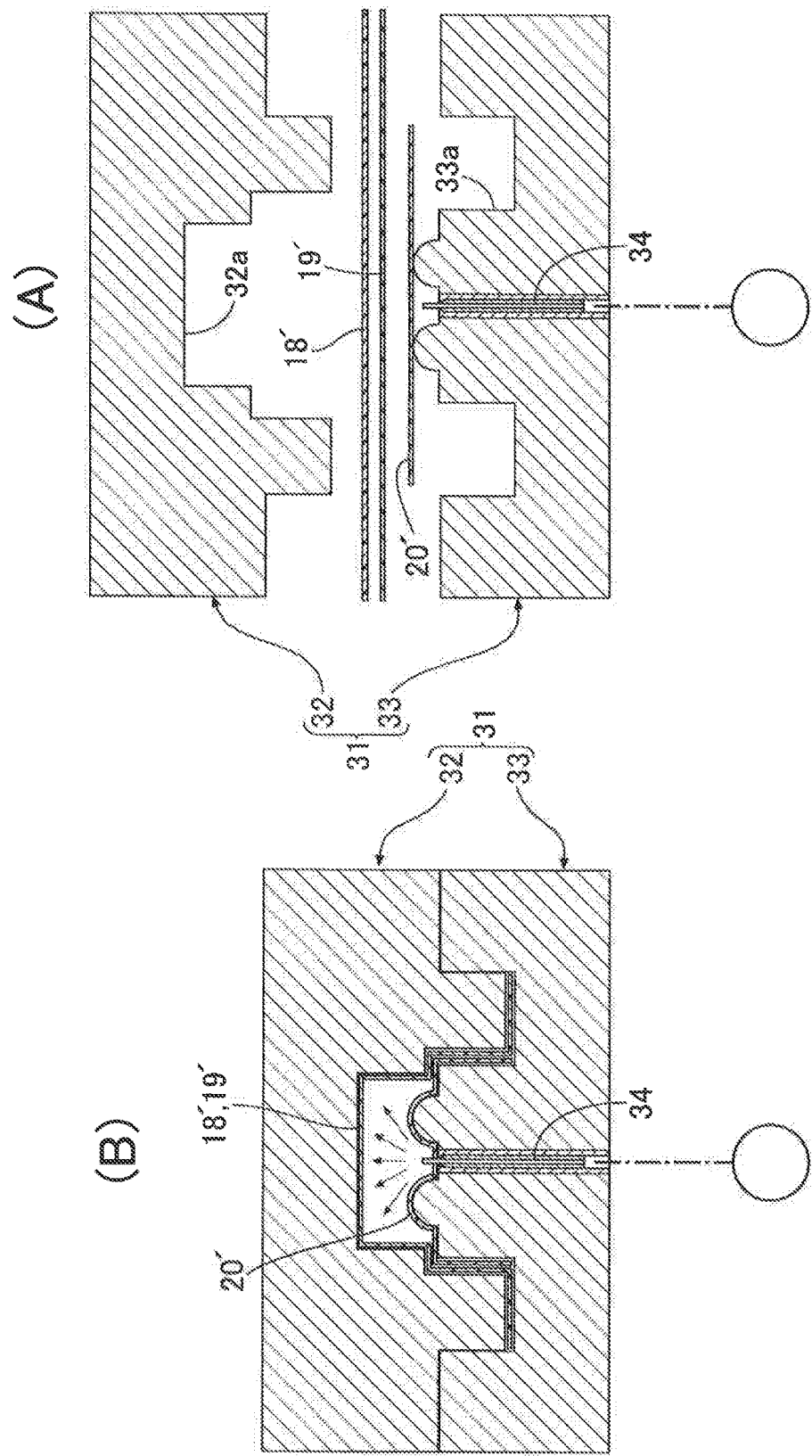
FIG. 8 is a sectional view of a mold for molding a bumper beam. (first embodiment)

As shown in FIG. 8, a mold 31 for press forming the bumper beam 11 and the reinforcing member 17 by a gas assist method is formed from a female die 32 having a concave cavity 32a for molding the rear face of the continuous fiber-reinforced resin sheet 18 and a male die 33 having a convex core 33a for molding front faces of the discontinuous fiber-reinforced resin sheet 19 and the discontinuous fiber-reinforced resin sheet 20. In a state in which the mold 31 is opened, a continuous fiber prepreg 18' and a discontinuous fiber prepreg 19' are disposed in a preheated state between the cavity 32a of the female die 32 and the core 33a of the male die 33, and in a portion of the mold 31 that is for molding opposite end parts in the vehicle width direction of the bumper beam 11, a discontinuous fiber prepreg 20' of the discontinuous fiber-reinforced resin sheet 20 of the reinforcing member 17 is further laminated on the discontinuous fiber prepreg 19', the extremity of a nozzle 34 for supplying inert gas being made to extend to between the discontinuous fiber prepregs 19' and 20'.

A prepreg employs as a reinforcing material a UD (sheet in which continuous fibers are aligned in one direction) or a plain or diagonally woven fabric made of a continuous fiber such as carbon fiber, glass fiber, or aramid fiber, or a discontinuous fiber mat and is formed by impregnating it with a semicured thermosetting resin (an epoxy resin, a polyester resin, etc.) or a thermoplastic resin (nylon 6, polypropylene, etc.), and it has a flexibility such that it conforms to the shape of a mold. In the case of a thermosetting resin, when a plurality of sheets of prepreg are inserted into a mold in a laminated state and heated to for example about 130° C. while applying pressure, the thermosetting resin is cured, thus giving a fiber-reinforced resin product. In the case of a plastic resin of the present embodiment, a plurality of sheets of preheated prepreg are inserted into a mold in a laminated state, press-molded, and then cooled, thus giving a fiber-reinforced resin product.

In the present embodiment, the reinforcing material for the continuous fiber prepreg 18' is a woven fabric in which continuous glass fibers are aligned in directions orthogonal to each other, and the reinforcing material for the discontinuous fiber prepregs 19' and 20' is a nonwoven fabric in which long discontinuous glass fibers having a fiber length of about 30 mm are aligned randomly.

Therefore, the female die 32 and the male die 33 are clamped together, inert gas is supplied from the extremity of the nozzle 34 extending to between the discontinuous fiber prepreg 19' for molding the bumper beam 11 and the discontinuous fiber prepreg 20' for molding the reinforcing member 17, the continuous fiber prepreg 18' and the discontinuous fiber prepreg 19' are made to come in intimate contact with the cavity 32a of the female die 32, the discontinuous fiber prepreg 20' is made to come in intimate contact with the core 33a of the male die 33, and the bumper beam 11 and the reinforcing member 17 are thus molded integrally at the same time. Employing this gas assist method enables the bumper beam 11 and the reinforcing member 17, which form a closed cross-section, to be easily molded integrally.

The operation of the first embodiment of the present invention having the above arrangement is now explained.

In a case in which a bumper beam of a subject vehicle undergoes a rear-end collision with a bumper beam of another vehicle, as shown in FIG. 9 (B), with regard to a conventional bumper beam, which simply curves convexly to the rear, since a collision load F is input in a concentrated manner into one point in the middle in the vehicle width direction of the bumper beam, as is clear from the bending moment diagram of the bumper beam, there is the problem that a large bending moment acts on a middle part in the vehicle width direction of the bumper beam.

Figure 2:
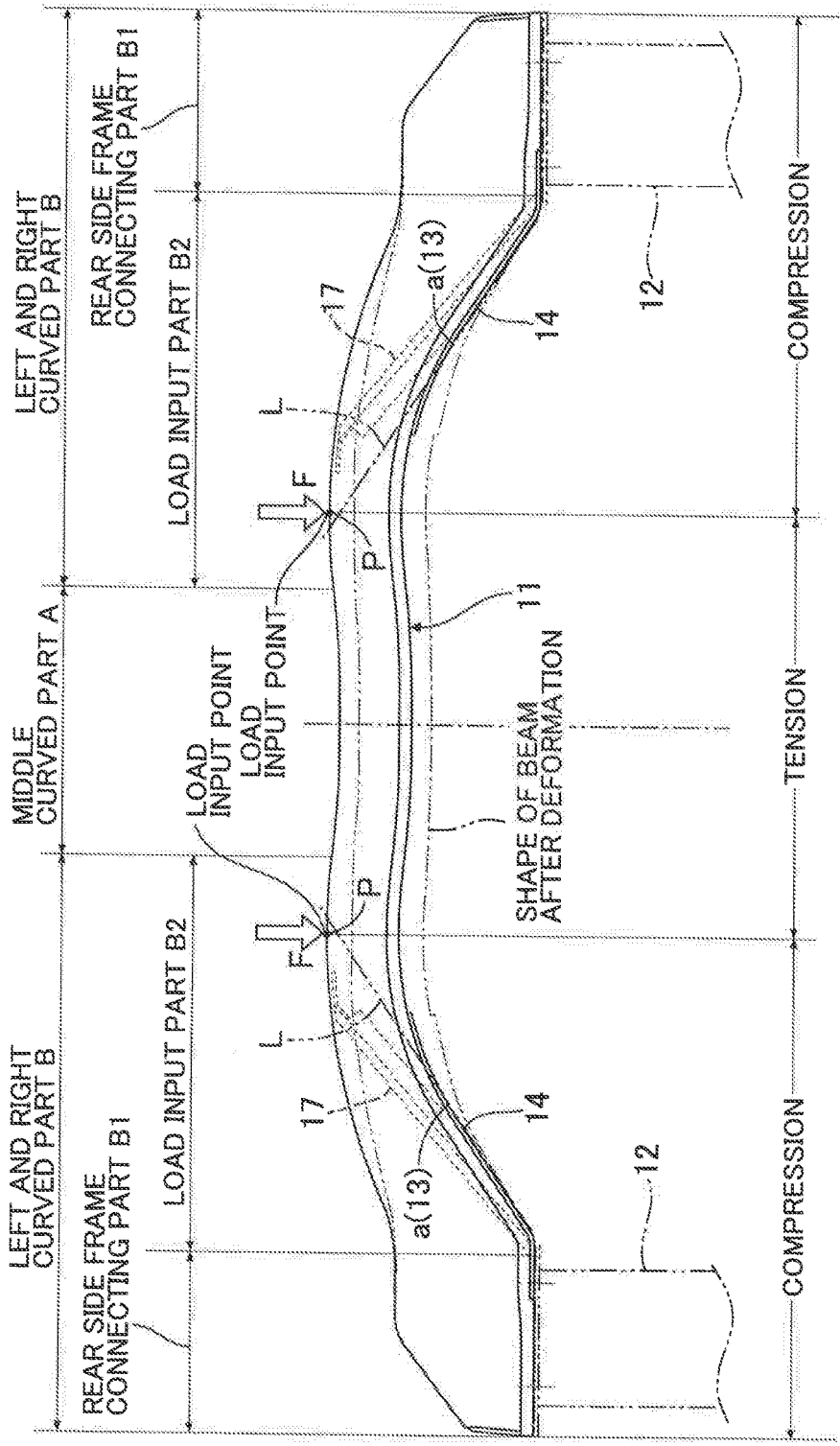
FIG. 2 is a view in the direction of arrow 2 in FIG. 1. (first embodiment)
Figure 3:
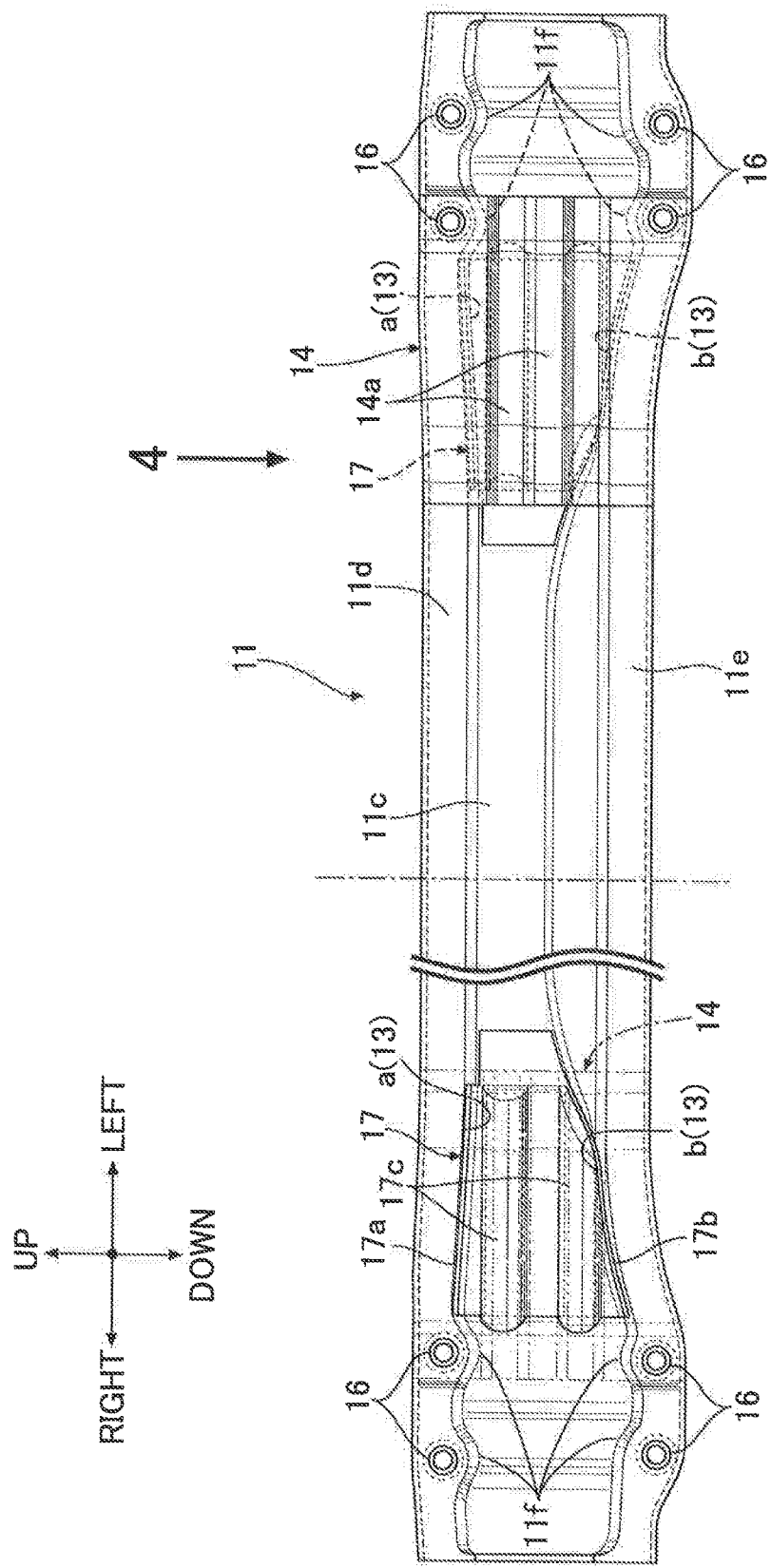
FIG. 3 is a view in the direction of arrow 3 in FIG. 1. (first embodiment)
Figure 4:
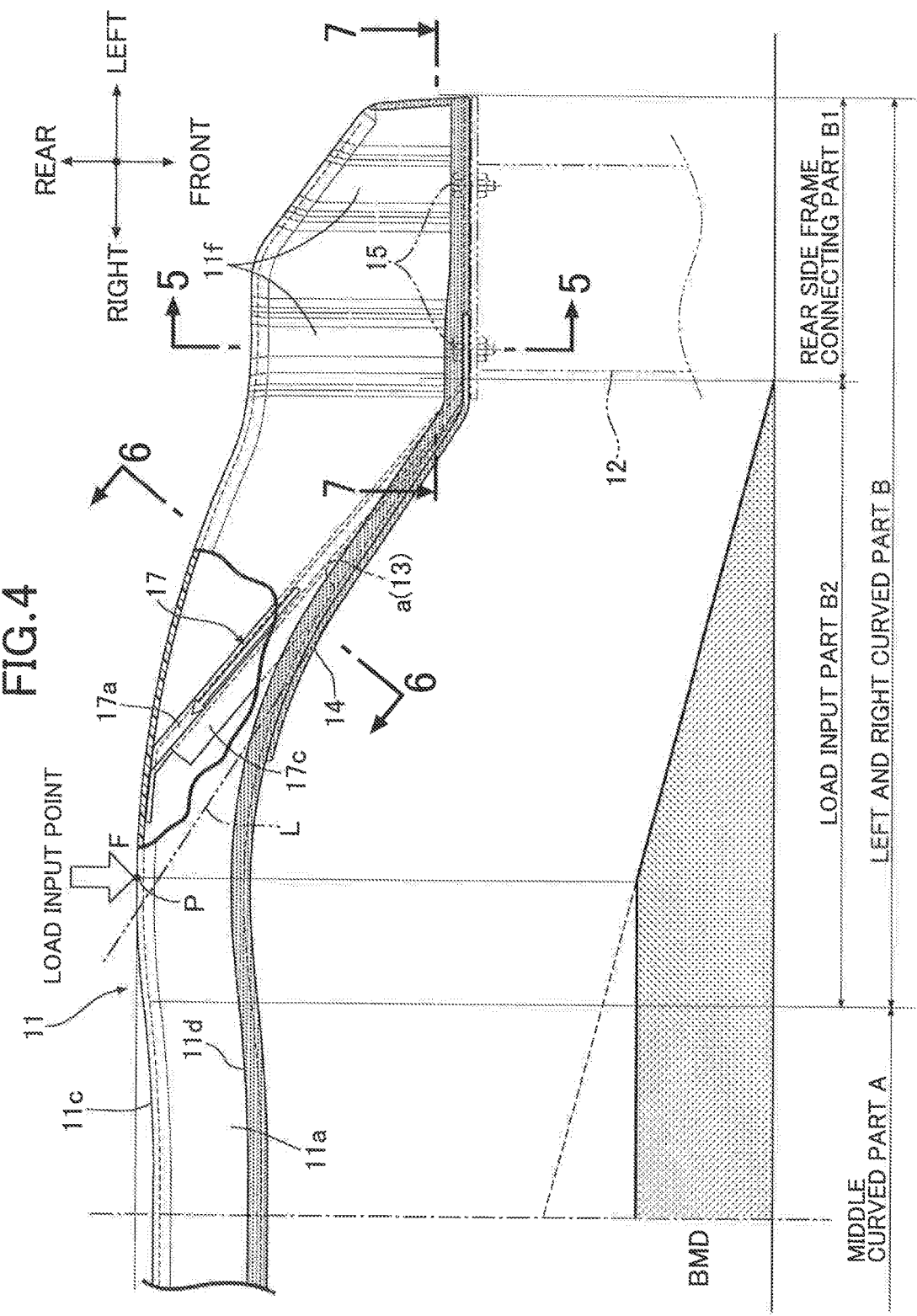
FIG. 4 is a view in the direction of arrow 4 in FIG. 3. (first embodiment)

In contrast thereto, as shown in FIG. 9 (A) and FIG. 2, the bumper beam 11 of the present embodiment includes the middle curved part A curving concavely to the rear, the pair of load input parts B2 and B2 on opposite sides in the vehicle width direction of the middle curved part A collide with the bumper beam of the other vehicle, and the collision load F is input in a concentrated manner into the load input points P and P at the extremities of the pair of load input parts B2 and B2. As a result, the maximum value of the bending moment acting on the bumper beam 11 decreases, and the strength of the bumper beam 11 toward bending deformation can be enhanced.

Furthermore, due to the shape of the bumper beam 11 of the present embodiment including the middle curved part A and the left and right curved parts B, when the collision load of a rear-end collision acts on the load input point P of the load input part B2, a compressive load acts on the left and right curved parts B further outside in the vehicle width direction than the load input point P, but since the bumper beam 11 includes the compression-resistant reinforcing part 13, which is formed from the upper ridge line a and the lower ridge line B provided along the front face of the load input part B2, and the extension line L of the compression-resistant reinforcing part 13 is directed toward the vicinity of the load input point P (see FIG. 2 and FIG. 4), supporting the compressive load by means of the compression-resistant reinforcing part 13 to thus prevent the bumper beam 11 from being destroyed enables the strength toward bending deformation to be enhanced without reinforcement by increasing the plate thickness of the bumper beam 11.

In this process, since the cross section of the bumper beam 11 is a U-shape opening forward, and the compression-resistant reinforcing part 13 is formed from the upper ridge line a and the lower ridge line b on the front side of the bumper beam 11, it is possible to provide the compression-resistant reinforcing part 13 with a simple structure without adding a special member. Moreover, since the back plate 14 is fixed to the compression-resistant reinforcing part 13 of the bumper beam 11, and a closed cross-section is formed from the bumper beam 11 and the back plate 14, preventing the bumper beam 11 from deforming in the mouth opening direction by forming a closed cross-section enables a compressive load to be supported more effectively to thus absorb the collision energy.

Furthermore, since the rear side frame connecting part B1 that is continuous with the outside in the vehicle width direction of the compression-resistant reinforcing part 13 includes the reinforcing beads 11f extending in the fore-and-aft direction, it is possible, by crumpling of the rear side frame connecting part B1, which is reinforced by the reinforcing beads 11f, to absorb the collision energy of an offset collision or high speed collision, which is difficult to absorb by means of bending deformation of the bumper beam 11 itself.

Moreover, since the reinforcing member 17 is disposed in the interior of the load input part B2, the inner end in the vehicle width direction of the reinforcing member 17 is connected to the load input point P, and the outer end in the vehicle width direction is connected to the compression-resistant reinforcing part 13, the load input point P into which the collision load is input is reinforced by the reinforcing member 17, and the collision load input into the load input point P is transmitted directly to the compression-resistant reinforcing part 13 via the reinforcing member 17, thus further enhancing the strength of the bumper beam 11 toward a compressive load. Furthermore, since the reinforcing member 17 includes the reinforcing beads 17c and 17c extending in the vehicle width direction, it is possible to enhance the strength of the reinforcing member 17 by means of the reinforcing beads 17c and 17c, thus enabling a collision load input into the load input point P to be transmitted to the compression-resistant reinforcing part 13 more effectively. Moreover, since a closed cross-section is formed from the bumper beam 11 and the reinforcing member 17, it is possible to further enhance the strength of the bumper beam 11 toward a compressive load.

SECOND EMBODIMENT

Figure 10:
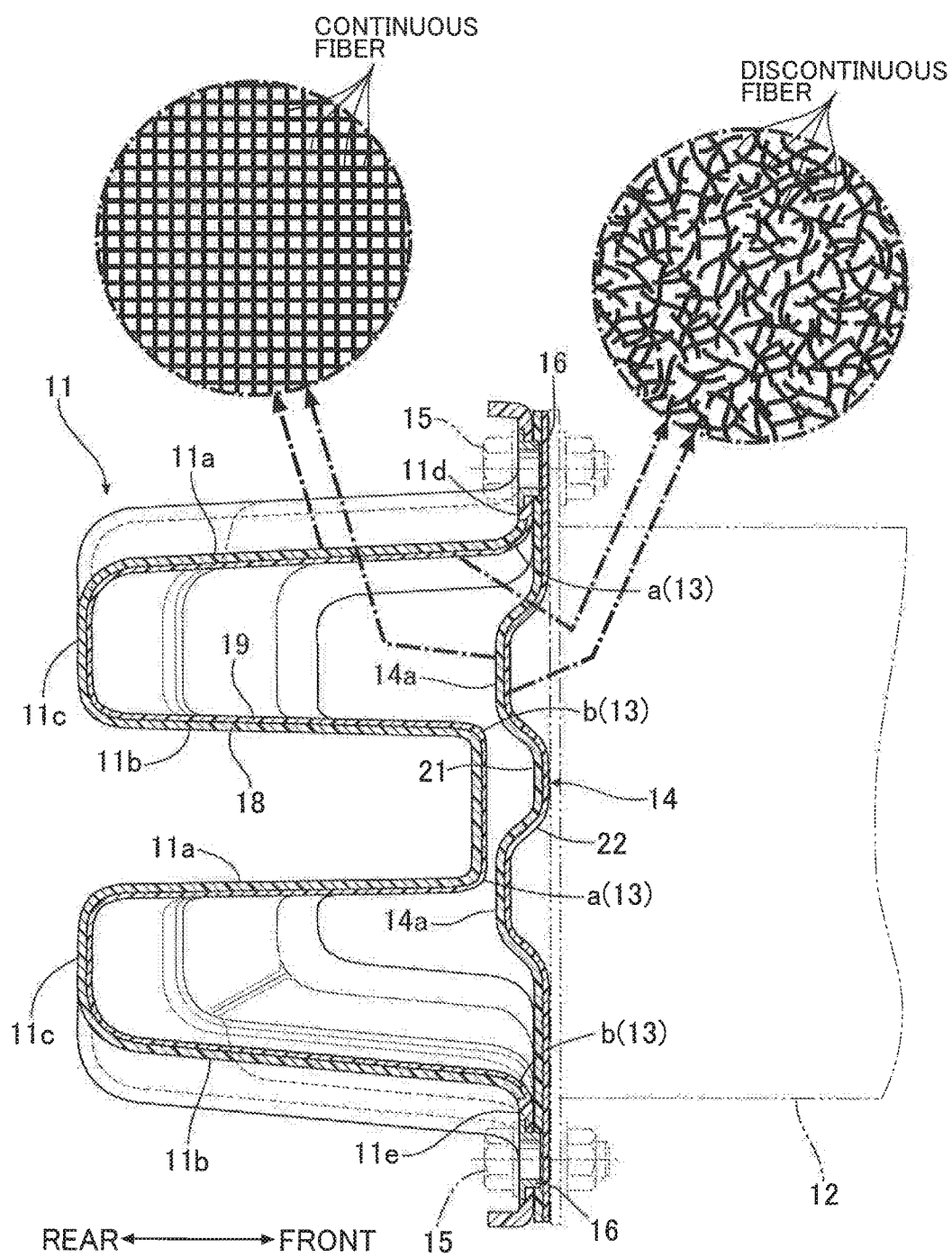
FIG. 10 is a view corresponding to FIG. 5. (second embodiment)

A second embodiment of the present invention is now explained by reference to FIG. 10.

The bumper beam 11 of the first embodiment has a U-shaped cross section, but a bumper beam 11 of the second embodiment has a W-shaped cross section. As a result, there are two each of upper ridge lines a and a and lower ridge lines b and b forming a compression-resistant reinforcing part 13, and the number of compression-resistant reinforcing part 13 is increased twofold, thus further enhancing the reinforcing effect.

Embodiments of the present invention are explained above, but the present invention may be modified in a variety of ways as long as the modifications do not depart from the spirit and scope thereof.

For example, in the embodiments the bumper beam 11 on the rear side is explained, but the present invention may be applied to a bumper beam on the front side. In the case of a bumper beam on the rear side, the outside in the fore-andaft direction corresponds to the rear, and in the case of a bumper beam on the front side, the outside in the fore-and-aft direction corresponds to the front.

Furthermore, the compression-resistant reinforcing part of the present invention is not limited to the upper ridge line a or the lower ridge line b of the embodiment, and it may be one that enhances the compression strength of the bumper beam 11.

The invention claimed is:

1. An automobile bumper comprising a fiber-reinforced resin bumper beam and having opposite end parts in a vehicle width direction of the bumper beam supported on an outer end part in a fore-and-aft direction of a pair of vehicle body frames, wherein the bumper beam comprises a middle curved part that curves concavely toward an outside in a fore-and-aft direction in a middle part in the vehicle width direction, and a pair of left and right curved parts that curve convexly toward the outside in the fore-and-aft direction on opposite sides in the vehicle width direction of the middle curved part, and the left and right curved parts comprise a vehicle body frame connecting part that is positioned on the outside in the vehicle width direction and is connected to the vehicle body frame, and a load input part that is positioned on an inside in the vehicle width direction and projects most to the outside in the fore-and-aft direction among the bumper beam parts, a compression-resistant reinforcing part being provided along an inner face in the fore-and-aft direction of the load input part (B2), and an extension line of the compression-resistant reinforcing part being directed toward a vicinity of a load input point of the load input part, and a reinforcing member is disposed in an interior of the load input part, an inner end in the vehicle width direction of the reinforcing member is connected to the load input point, and an outer end in the vehicle width direction is connected to the compression-resistant reinforcing part.

2. The automobile bumper according to claim 1, wherein the bumper beam has a cross section having a V-shape or W-shape that opens toward an inside in the fore-and-aft direction, and the compression-resistant reinforcing part is a ridge line on the inside in the fore-and-aft direction of the bumper beam.

3. The automobile bumper according to claim 1, wherein the vehicle body frame connecting part, which is continuous with the compression-resistant reinforcing part, comprises a reinforcing bead extending in the fore-and-aft direction.

4. The automobile bumper according to claim 1, wherein a back plate is fixed to the compression-resistant reinforcing part, and the bumper beam and the back plate form a closed cross-section.

5. The automobile bumper according to claim 1,
wherein the reinforcing member comprises a reinforcing bead extending in the vehicle width direction.

6. The automobile bumper according to claim 1, wherein the bumper beam and the reinforcing member form a closed cross-section.

7. The automobile bumper according to claim 6, wherein the reinforcing member is molded integrally with the bumper beam by a gas assist method.

8. The automobile bumper according to claim 2, wherein the vehicle body frame connecting part, which is continuous with the compression-resistant reinforcing part, comprises a reinforcing bead extending in the fore-and-aft direction.

* * * * *